UNITED STATES PATENT OFFICE.

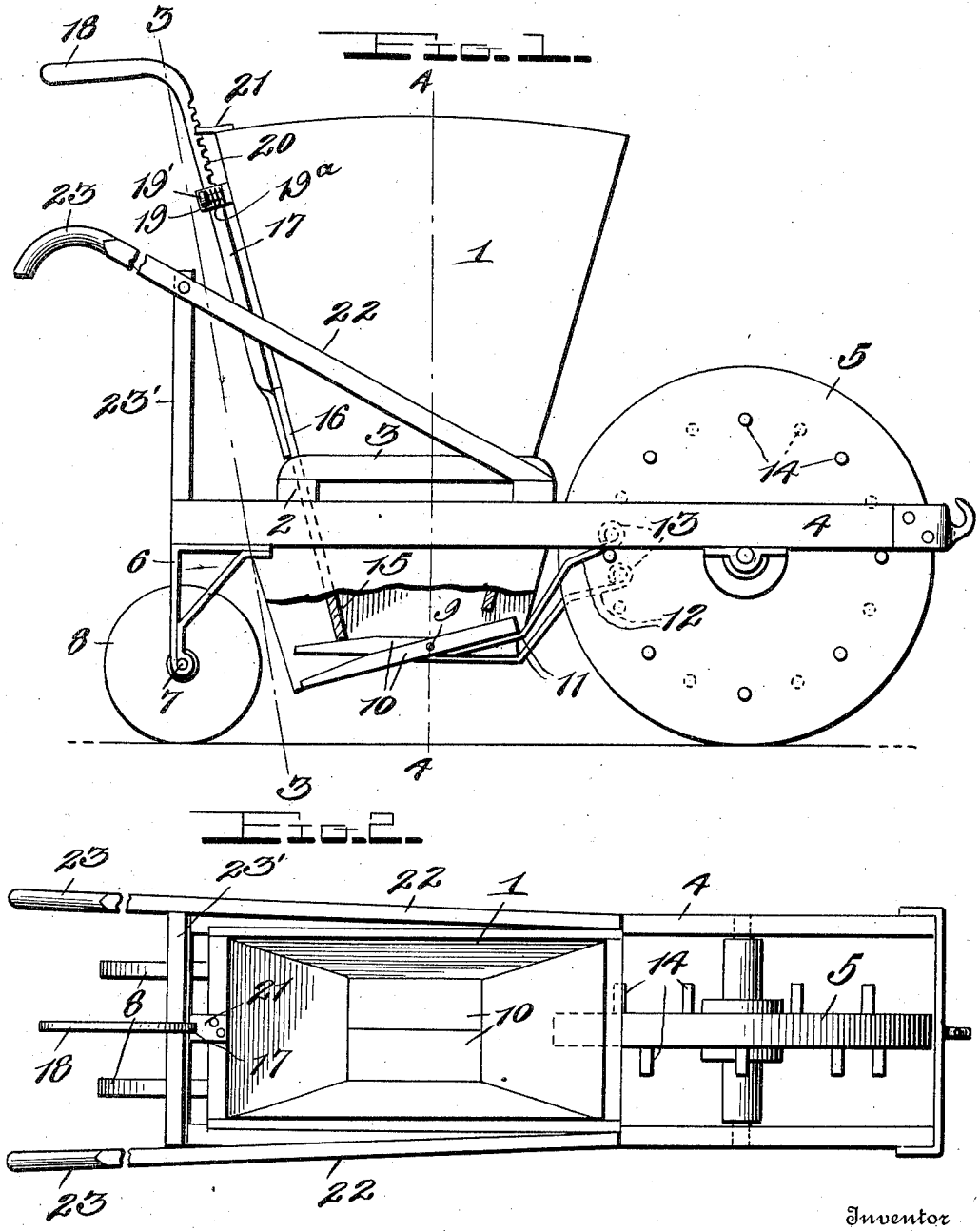

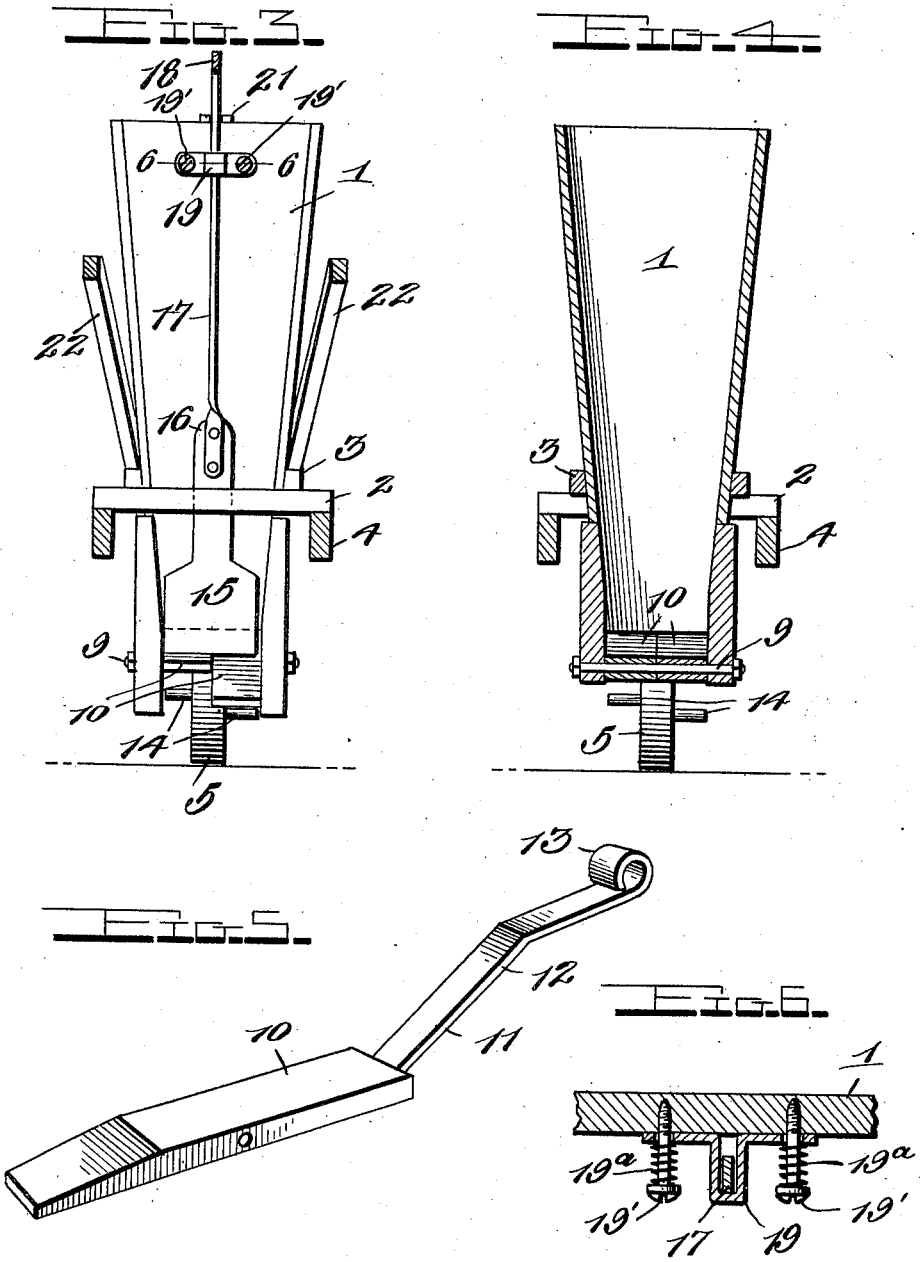

GEORGE WASHINGTON SMITH, OF BOYKINS, VIRGINIA, ASSIGNOR OF TWO-THIRDS TO CLAUDE T. BEATON, OF BOYKINS, VIRGINIA.

FERTILIZER-DISTRIBUTER.

1,036,922. Specification of Letters Patent. Patented Aug. 27, 1912.

Application filed February 17, 1912. Serial No. 678,227.

*To all whom it may concern:*

Be it known that I, GEORGE WASHINGTON SMITH, a citizen of the United States, residing at Boykins, in the county of Southampton and State of Virginia, have invented certain new and useful Improvements in Fertilizer-Distributers, of which the following is a specification, reference being had to the accompanying drawings.

This invention relates to new and useful improvements in the class of devices known as seeders and planters and more particularly to a fertilizer distributer, and my object is to provide a device of this character, wherein any fertilizing material may be readily distributed as the device is propelled forwardly.

A further object of the invention resides in the provision of a device having means thereon for the adjustment of the dropping or distributing mechanism, whereby more or less of the fertilizing material may be distributed as the device is propelled.

A still further object of the invention resides in the provision of a hopper, the bottom of which is formed of a pair of pivoted plates and a still further object resides in the provision of means for the alternate oscillation of said plates.

Still another object of the invention resides in the provision of means to adjust the oscillation of said plates to correspondingly adjust the amount of fertilizer that is to be distributed.

A still further object of the invention resides in the provision of arms on the pivoted plates forming the bottom of the hopper and pins formed on one of the supporting wheels of the device adapted to contact with said arms as said wheel is rotated to correspondingly oscillate the plates secured to said arms.

Still another object of the invention resides in the provision of a device which is extremely simple in construction, thereby cheaply manufactured, and one which is very effective and useful in operation.

With these and other objects in view, my invention consists in the novel features of construction, combination and arrangement of parts, that will be hereinafter referred to and more particularly pointed out in the specification and claim.

In the accompanying drawings, forming a part of this application, Figure 1 is a side elevation of the device; Fig. 2 is a top plan view thereof; Fig. 3 is a vertical section as seen on line 3—3, Fig. 1; Fig. 4 is a vertical section of the device as seen on line 4—4, Fig. 1. Fig. 5 is a detailed perspective view of one of the dropping plates, forming the bottom of the hopper, removed; and Fig. 6 is a section as seen on line 6—6, Fig. 3.

In carrying out my invention I shall refer to the drawings in which similar reference characters represent corresponding parts throughout the several views and in which—

1 indicates a hopper of any desired size, the same tapering toward its lower end and mounted between the cross bars 2 and the longitudinal brace bars 3 of an elongated frame 4. The lower portion of the hopper 1 extends below the side bars of the frame 4 and rotatably mounted in said frame adjacent the forward end thereof is an enlarged front supporting wheel 5, while the opposite end or rear portion of the frame 4 has extending therefrom a pair of brackets 6 between which is rotatably mounted an axle 7 carrying an additional pair of supporting wheels 8. The lower portions of the said walls of said hopper are extended a short distance below the front and rear walls thereof and mounted in these side walls below the front and rear walls is a shaft 9 upon which is pivotally mounted a pair of plates 10. These plates fit snugly against the side walls of the hopper and form a substantial bottom therefor and secured to the under faces of side plates are the straps 11, which are extended upwardly and outwardly from the hopper to form the arms 12, said arms extending on opposite sides of the forward supporting wheel 5. The free ends of said arms 12 are bent to form heads or the like 13 thereon and the faces of said wheel 5 are provided with the laterally extending pins 14, said pins being arranged in circular alinement on each face of the wheel and the pins on one face being disposed in staggered relation with the pins on the opposite face. The heads 13 of said arms 12 are disposed in the path of the pins 14 and thus it will be seen that as said wheel 5 is rotated, the pins will contact with said heads to alternately oscillate said plates 10, it being understood that the weight of the heads 13 will cause the plates to return to their initial positions, when they have been raised or oscillated at one end by the engagement of the pins 14 with said head. As the wheel 5 is driven forwardly it will be seen that the pins 14 will engage the heads 13 in their upward movement, thereby lowering the free or rear ends of said plates 10, as said heads 13 are engaged with the pins and as these plates are oscillated through this means, the fertilizing material in the hopper will be dropped at the free or rear ends of said plates, but I have also provided means to limit the oscillation of said plates to correspondingly adjust the amount of material which is to be distributed. To this end I provide a plate 15 which is slidably mounted on the rear wall of said hopper between the side walls thereof and adapted to cover the opening left between the rear wall and the plates 10, which form a substantial bottom for the hopper. This plate is provided with an elongated vertically extending arm 16, which is guided through a key-way or the like formed in one of the cross bars 2 of the frame and has secured thereto the rod 17 which extends upwardly therefrom to a point above the upper portion of the hopper 1, to form a handle member 18. This rod 17 extends through the keeper 19 which is loosely mounted on headed pins 19' engaged with the rear wall of the hopper, said pins being encircled by coil springs 19ª which normally retain said keeper in yielding engagement with said rear wall. Said rod is provided adjacent its upper end with a rack 20, while a stationary plate or detent 21 is provided on the upper edge of the rear wall of said hopper and the tension of the springs 19ª forcing inwardly upon the keeper 19, will normally retain the teeth of said rack in engagement with said plate or detent 21. When it is desired to completely stop the oscillation of the plates 10 to prevent the material in the hopper from being distributed, said rod 17 is drawn outwardly to disengage the rack thereon from the plate 21 and then forced downwardly until the plate 15, secured to the lower end thereof, is forced into engagement with the plates 10 adjacent their free or rear ends. This action will, of course, dispose the opposite ends of said plates upwardly and correspondingly dispose the arms 12 in such a position as to force the heads 13 thereof beyond the path of the pins 14, whereby the wheel 5 may be rotated without affecting the plates whatsoever. When it is desired to allow a small amount of fertilizer material to be distributed, however, the rod 17 may be raised slightly so that the lower end of the plate 15 is disposed a short distance above said plates and in this position the teeth of the rack 17 are engaged by the plate 21 to retain said rods in the adjusted position. In this position the plates will be allowed to oscillate slightly and allow a small amount of fertilizing material to be distributed as the device is propelled forwardly and when it is desired to allow a greater amount of material to be distributed, the rod 17 is adjusted higher, so as to allow a greater amount of play between the free ends of said plates 10 and the lower end of said plate 15.

In order to provide means for the manual propulsion of the device the arms 22 are provided on opposite sides of the hopper 1, the lower ends of which are engaged with one of the cross bars 2 on the frame 1 and said arms are retained at an oblique angle upwardly by means of the bracing member 23' also carried on said frame 1 at the rear end thereof. The free ends of said arms 22 are provided with handles 23, whereby an operator may readily grasp the same and propel the device forwardly.

From the foregoing it will be seen that I have provided an improved fertilizer distributer, wherein the distributing or dropping mechanism may be adjusted to allow a greater or lesser amount of fertilizer to be distributed, as desired. Furthermore it will be seen that the substantial bottom of the hopper forms a portion of the dropping mechanism in that the same comprises a pair of pivoted plates which are adapted to be oscillated as the device is moved forwardly. It will further be seen that by providing arms on these pivoted plates, which arms extend on opposite sides of the forward supporting wheel and by providing laterally extending pins on said wheel, which are adapted to contact with the free ends of said arms, said plates will be readily oscillated as the wheel is rotated in the forward movement of the device. It will still further be seen that by providing a slidable plate on the rear wall of the hopper, which plate is adapted to contact with the free ends of said dropping plates forming the bottom of the hopper, the oscillation of said plates may be adjusted to correspondingly adjust the amount of fertilizer that may be distributed. Furthermore it will be observed that when the sliding plate on the rear wall of the hopper is adjusted to be forced into engagement with both of the plates forming the bottom of the hopper, said plates will be prevented from being oscillated and the arms on the opposite ends thereof disposed out of the path of the pins on the forward supporting wheel, thereby preventing the distributing of the fertilizing material. It will still further be seen that my device is extremely simple and durable in construction, is one which may be readily and cheaply manufactured, and one which is very effective and useful in operation.

What I claim is:

A fertilizer distributer comprising a frame, a hopper mounted thereon, the bottom of said hopper being composed of a pair of pivoted plates, supporting wheels rotatably mounted on said frame, one of said wheels being provided with a plurality of laterally extending pins, extensions formed on the plates forming the bottom of the hopper and disposed in the path of said pins to oscillate said plates as the wheel is rotated, a pair of headed pins mounted in the rear wall of said hopper adjacent the upper end thereof, a keeper loosely mounted on said pins, coil springs encircling said pins to yieldingly retain said keeper against the rear wall of the hopper, a rod loosely extended through said keeper and provided with a handle member at the upper end thereof, said rod also having formed on the one side edge thereof a plurality of teeth, a plate secured to the lower end of said rod adapted to be disposed in position to engage said plates as the same are oscillated to limit the movement thereof, and a stationary detent mounted on the upper edge of the rear wall of said hopper adapted to engage the teeth of said rod as the same is forced inwardly.

In testimony whereof I hereunto affix my signature in the presence of two witnesses.

GEORGE WASHINGTON SMITH.

Witnesses:
J. W. MARTIN,
J. W. FLEETWOOD.

---

Copies of this patent may be obtained for five cents each, by addressing the "Commissioner of Patents, Washington, D. C."